Patented Feb. 23, 1954

2,670,306

UNITED STATES PATENT OFFICE 2,670,306

PRESSURE SENSITIVE ADHESIVES CONTAINING GRAPHITE

John H. Folwell, Rochester, N. Y., assignor to Eastman Kodak Company, Rochester, N. Y., a corporation of New Jersey No Drawing. Application January 25, 1951, Serial No. 207,850

1 Claim. (Cl. 117—122)

This invention relates to pressure sensitive adhesives, and more particularly to black adhesive tapes and sheets. Black adhesive tapes have been known for many years. Electrical insulating tape is a good example. The black color of the adhesive composition on these tapes was imparted by asphaltum used as a component of the adhesive composition. The asphaltum was used primarily for its adhesive properties, the black color being incidental and for many purposes unnecessary. However, in the photographic industry black adhesive tape is required. It is used as a light-tight seal for film cans, motion-picture film magazines, and the like. It is also preferred as a splicing tape in processing photographic film, because the contrast of the black tape with the film makes it easily visible. Recently it has not been possible to obtain asphaltum having the desired adhesive qualities for use in adhesive tapes. Other adhesive substances are available, but they do not impart a black color to the adhesive mixture. The use of black cloth as a backing is not of itself completely efficacious, because the cloth is porous and allows a certain amount of light to penetrate. Introduction into the adhesive composition of carbon black, the pigment commonly used for imparting a black color to rubber, or of other amorphous carbons, such as lamp black, was found to be unsatisfactory, because these pigments, even in small amounts, cause a deadening of the adhesive tack.

I have discovered that satisfactory black pressure sensitive adhesives can be made by using powdered graphite as a black pigment in the adhesive composition. The graphite should be finely powdered, and may be used in amounts varying from 2.5% to 25% of the total solids in the adhesive composition. A good example of finely powdered graphite is Dixon's micronized 200–06 type air-spun graphite, but it will be understood that my invention is not limited to the use of this particular graphite.

Apart from the graphite, the composition of the adhesive forms no part of my invention. The graphite may be used in any pressure sensitive adhesive composition, with satisfactory results. Many pressure sensitive adhesives are known to the art. They usually contain one or more resins, together with either a cellulose ester or a substance of the rubber type (rubber, synthetic rubber, or polymerized unsaturated hydrocarbons), plus various modifiers.

By way of illustrating the way in which my invention may be carried out, I give the following examples.

Example I

| | Per cent |
|---|---|
| Crepe rubber solution (11% in benzene) | 60.00 |
| Rosin | 3.00 |
| Venice terpentine | 1.50 |
| Burgundy pitch | 1.50 |
| Piccolyte S115 | 1.30 |
| Agerite resin (aldol α-naphthylamine) | 0.25 |
| Graphite grind mix | 10.00 |
| Benzene | 22.45 |
| | 100.00 |

The graphite grind mix consists of:

| | Per cent |
|---|---|
| Finely powdered graphite | 48.00 |
| Lanolin | 30.00 |
| Benzene | 22.00 |
| | 100.00 |

Piccolyte S115 is a hydrocarbon thermoplastic terpene resin composed essentially of polymers of pinene, especially beta pinene or nopinene, and is manufactured by the Pennsylvania Industrial Chemicals Corporation, of Clairton, Pennsylvania. In this example, the graphite constitutes about 22% of the total solids.

Example II

| | Per cent |
|---|---|
| Crepe rubber solution (11% in benzene) | 66.00 |
| Black grind | 7.00 |
| Rosin | 3.31 |
| Venice turpentine | 1.67 |
| Burgundy pitch | 1.66 |
| Piccolyte S115 | 2.50 |
| Agerite resin | .20 |
| Benzene | 17.66 |
| | 100.00 |

The black grind consists of:

| | Per cent |
|---|---|
| Zinc oxide | 35.50 |
| Cornstarch | 20.10 |
| Graphite | 8.90 |
| Lanolin | 18.40 |
| Benzene | 17.10 |
| | 100.00 |

In this example, the graphite constitutes slightly less than 3% of the total solids.

Example III

| | Per cent |
|---|---|
| Synthetic rubber (GR–S–85) | 12.00 |
| Rosin or rosin substitute | 10.00 |
| Graphite | 6.00 |
| Lanolin | 2.00 |
| Agerite resin | 0.5 |
| Benzene | 29.5 |

Synthetic rubber GR–S–85 is a copolymer of butadiene and styrene.

In this example, graphite constitutes 8.5% of the total solids.

Example IV

| | Per cent |
|---|---|
| Vistanex (high molecular weight polymers of isobutylene) | 16 |
| Vistac #1 (low molecular weight polymers of isobutylene) | 4 |
| Staybelite resin (hydrogenated resin ester) | 5 |
| Graphite | 2 |
| Benzene or naphtha | 71.5 |
| Hydroabietyl alcohol | 1.5 |

Vistanex and Vistac are manufactured by the Enjay Co., Inc., of New York, N. Y.

In this example, graphite constitutes 7% of the total solids.

Example V

| | Percent |
|---|---|
| Rubber (alkali reclaim) | 24 |
| Lanolin | 3 |
| Graphite | 5 |
| Rosin | 10 |
| Naphtha | 58 |

In this example, graphite constitutes 12% of the total solids.

Example VI

| | Percent |
|---|---|
| Polyvinyl acetate (35–100 Ford cup viscosity) | 6 |
| Cellulose acetate-butyrate | 6 |
| Nevillac, pale hard (phenolindenecoumarone resin) | 26 |
| Neville Oil #2 (indene polymer) | 16 |
| Graphite | 8 |
| Dibutyl phthalate | 10 |
| Benzene | 28 |

Nevillac and Neville oil are manufactured by the Neville Co., Pittsburgh, Pennsylvania.

In this example, graphite constitutes 11% of the total solids.

Example VII

| | Percent |
|---|---|
| Blown castor oil solution (60% blown oil, 40% ethyl acetate) | 55 |
| Cellulose nitrate | 18 |
| Rosin or rosin substitute | 13.5 |
| Graphite | 3 |
| Hydroquinone | 0.5 |
| Acetone | 10 |

In this example, graphite constitutes 4.4% of the total solids.

Any of these adhesive compositions can be spread on cloth or paper or other suitable backing, and the volatile solvent allowed to evaporate, to give a pressure sensitive adhesive sheet which can be slit to form tape.

What I claim as my invention, and desire to be secured by Letters Patent of the United States, is:

A pressure sensitive adhesive tape comprising a black backing carrying a black pressure sensitive adhesive coating, the coating containing a resin, a substance of the rubber type selected from the group consisting of natural rubber, butadiene-styrene copolymer, and polyisobutylene, and from 2.5% to 25%, calculated on the total solids, of powdered graphite.

JOHN H. FOLWELL.

References Cited in the file of this patent

UNITED STATES PATENTS

| Number | Name | Date |
|---|---|---|
| 243,782 | Mayall | July 5, 1881 |
| 1,122,248 | Brandenburger | Dec. 29, 1914 |
| 2,181,835 | Place | Nov. 28, 1939 |
| 2,468,594 | Dustin | Aug. 26, 1949 |
| 2,492,689 | Danowitch | Dec. 27, 1949 |
| 2,510,727 | Sussmbach | June 6, 1950 |
| 2,531,541 | Spicer | Nov. 28, 1950 |

FOREIGN PATENTS

| Number | Country | Date |
|---|---|---|
| 441,877 | Great Britain | Jan. 27, 1936 |